United States Patent
Kaiser et al.

[11] Patent Number: 5,954,825
[45] Date of Patent: Sep. 21, 1999

[54] METHOD FOR ISOLATING FAULTS ON A CLOCKED SYNCHRONOUS BUS

[75] Inventors: John Michael Kaiser; Warren Edward Maule, both of Cedar Park, Tex.

[73] Assignee: International Business Machines Corporation, Armonk, N.Y.

[21] Appl. No.: 08/837,183

[22] Filed: Apr. 11, 1997

[51] Int. Cl.[6] ................................................ G06F 11/00
[52] U.S. Cl. ........................ 714/43; 714/56; 714/34; 714/798
[58] Field of Search ................... 395/183.19, 182.15, 395/183.1, 185.09, 287–304; 714/43, 56, 39, 34, 798; 710/107–124

[56] References Cited

U.S. PATENT DOCUMENTS

| | | | |
|---|---|---|---|
| 4,710,691 | 12/1987 | Bergstrom et al. | 318/696 |
| 5,220,567 | 6/1993 | Dooley | 371/5.1 |
| 5,253,184 | 10/1993 | Kleinschnitz | 364/550 |
| 5,303,353 | 4/1994 | Matsuura et al. | 395/325 |
| 5,319,679 | 6/1994 | Bagby | 375/106 |
| 5,339,395 | 8/1994 | Pickett | 395/325 |
| 5,383,201 | 1/1995 | Satterlee | 371/29.1 |
| 5,410,542 | 4/1995 | Gerbehy et al. | 370/85.1 |
| 5,444,859 | 8/1995 | Baker et al. | 395/183.06 |
| 5,511,170 | 4/1996 | Abdoo | 395/280 |
| 5,519,830 | 5/1996 | Opoczynski | 395/182.02 |
| 5,533,037 | 7/1996 | Shah et al. | 371/62 |
| 5,594,861 | 1/1997 | Jonsson et al. | 395/181 |
| 5,623,645 | 4/1997 | Yip et al. | 395/551 |
| 5,649,175 | 7/1997 | Kanekal et al. | 395/551 |
| 5,671,369 | 9/1997 | LaBerge et al. | 395/287 |
| 5,812,796 | 9/1998 | Broedner et al. | 395/283 |

*Primary Examiner*—Dieu-Minh T. Le
*Attorney, Agent, or Firm*—George R. Schultz; Akin, Gump, et al.; Volel Emile IBM Corporation

[57] ABSTRACT

A shift register is used to latch the bus-driver-enable signal for each potential bus driver during each system clock cycle. The shift register clock will freeze upon receipt of a "check stop" signal. Once frozen, the shift register can be scanned for fault isolation analysis.

12 Claims, 3 Drawing Sheets

_5,954,825_

METHOD FOR ISOLATING FAULTS ON A CLOCKED SYNCHRONOUS BUS

FIELD OF THE INVENTION

This invention relates to a method for isolating faults on a clocked synchronous bus.

BACKGROUND OF THE INVENTION

Computer systems such as computer workstations operate due to the passage of information between at least one microprocessor and various subsystems. Communications between the microprocessor(s) and subsystems occur over a data communication pathway called a bus. In a present-day system, there are often multiple processors that are capable of "driving" a bus by requesting or sending data over the bus. In such a system, communications may be synchronized to a bus clock. In the resulting multi-drop system that supports synchronous bus communications, detection of faults can be difficult.

Since bi-directional buses by their very nature can be driven by multiple sources and are subject to various phenomena such as cross talk, reflections, etc., error isolation is difficult. Typically, these types of buses are protected by parity-checking or Error Correcting Code ("ECC") circuits. On a common bus, several receivers and even the driver of the bus may report an error at the same time. To improve the fault isolation, both the receiver that detected the error and the bus driver must be identified. This invention provides a method for locating the driver of a bus when errors occur on a multi-drop clocked synchronous I/O or system bus for fault isolation purposes.

One goal of fault-detection schemes in synchronous multi-drop systems is to identify the receiver and the driver of the communication in progress at the time a transmission error is detected. In current schemes, it is difficult to identify the bus driver at the time of error without complex investigation involving the arbiter of the system, checking the command on the bus, etc. The present method overcomes the complexity of prior art fault detection systems by latching the bus-driver-enable signal in a shift register to aid in detection of the bus driver at the time of error.

SUMMARY OF THE INVENTION

The present invention relates to a method for isolating faults on a clocked synchronous data or address system or I/O bus. Specifically, the invention relates to a method of locating the driver of a bus at the time of error on a multi-drop clock synchronous I/O or system bus for fault isolation purposes. The system utilizes a shift register to latch the bus-driver-enable signal for each potential bus driver during each clock cycle.

The present invention is implemented within the context of a computer workstation system that allows information to be transferred between at least one microprocessor and at least one I/O device over at least one bus. Each potential bus driver implements an N-bit shift register. The potential bus drivers' bus driver enable signal(s) are fed as a data input into the right-most bit of the shift register. For multiple buses, multiple shift registers are used. In addition, each potential bus driver receives as an input a "checkstop" signal which is asserted by any processor or subsystem on the bus that detects a bus transfer error (for example, a parity error or ECC check on the data or address). The checkstop signal, when asserted, will freeze the functional clocks of the bus participants so that the N-bit shift registers may be scanned for fault isolation analysis in a manner well known. Scanning or reading the shift register along with the error check bits in the other chips can determine which unit recorded an error as a receiver and which unit was driving the bus in the previous clock cycles before the checkstop signal was asserted.

BRIEF DESCRIPTION OF THE DRAWINGS

The foreground aspects and other features of the present invention are explained in the following written description, taken in connection with the accompanying drawings, wherein.

DETAILED DESCRIPTION OF THE DRAWINGS

Figure 1:
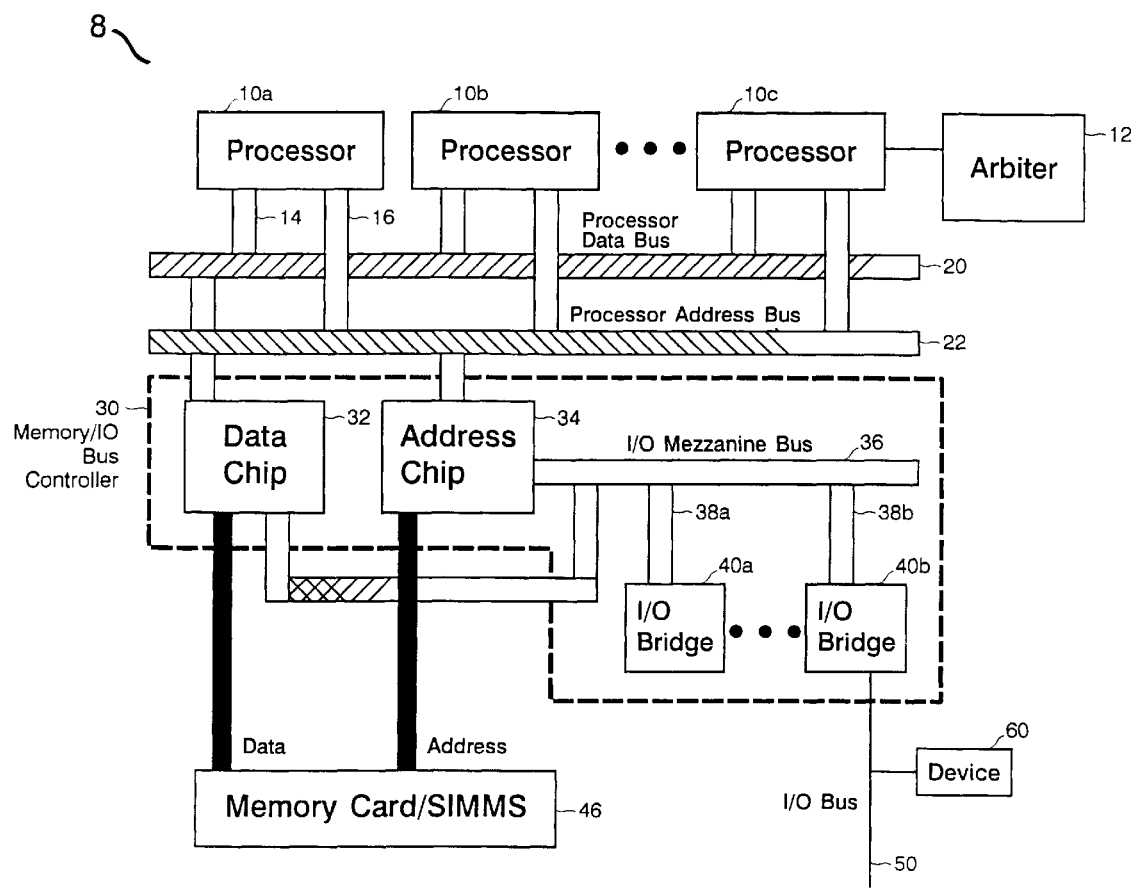
FIG. 1 is a computer system in which the present invention can be employed.

The method of the present invention is implemented in the context of a computer workstation system with at least one microprocessor and at least one I/O device that can utilize at least one bus to transfer information to each other. A computer system typically used in conjunction with a software operating system that controls communications between microprocessors and I/O devices is illustrated in FIG. 1. A computer workstation system is the combination of interconnected components. For example, a microprocessor 10 is connected by data link 14 to a data bus 20 and connected by data link 16 to an address bus 22. Additional microprocessors 10b, 10c may be similarly connected to the processor data bus 20 and the processor address bus 22. An arbiter 12 generally processes requests from a processor 10 to assign access to the data bus 20 and address bus 22. This access allows the processor to become the bus "driver."

Figure 2:
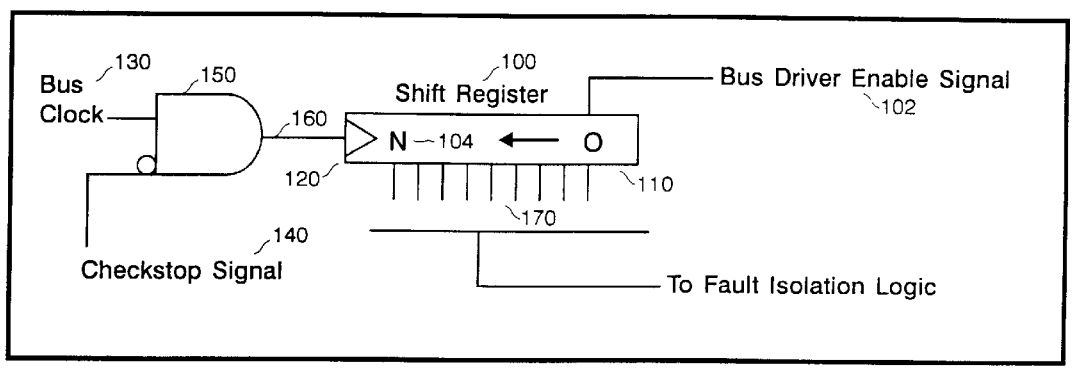
FIG. 2 is a schematic representation of an N-bit shift register used to implement the present invention.

FIG. 2 is a schematic representation of an N-bit shift register used to implement the present invention. The number of bits, N 104, comprising the shift register 100 must be determined, based on system parameters, by the user. Multiple bits are necessary because looking at the enable signal 102 for each potential bus driver 10 at the time of error may not sufficiently capture error status. This is true because several cycles of the bus clock 130 may occur before the system 8 can be frozen or disengaged upon a bus communication error. In other words, there may exist several cycles of the bus clock 130 between the time a checkstop signal 140 is asserted and freezing or disengaging of the system 8 based upon such signal 140. The latching or staring feature of the shift register 100 is thus necessary in the event that: 1) after the error occurs, a non-failing driver 10 has subsequently been enabled; 2) after the error occurs, the failing driver has subsequently been disabled; or 3) multiple drivers were erroneously enabled. As a result, the number N 104 of bits comprising the shift register 100 must be chosen by the user to be large enough to accommodate the maximum number of clock 130 cycles between the time of error and assertion of the checkstop signal 140. Upon receipt of a check stop signal 140 the shift register clock 150 is halted. In the preferred embodiment, this halt function is processed by logic which combines as the shift register clock input 160 the bus clock 130 signal and the inverse state of the checkstop signal 140. After the halt, the contents 170 of the shift register can be scanned by fault isolation logic well-known in the art.

Figure 3:
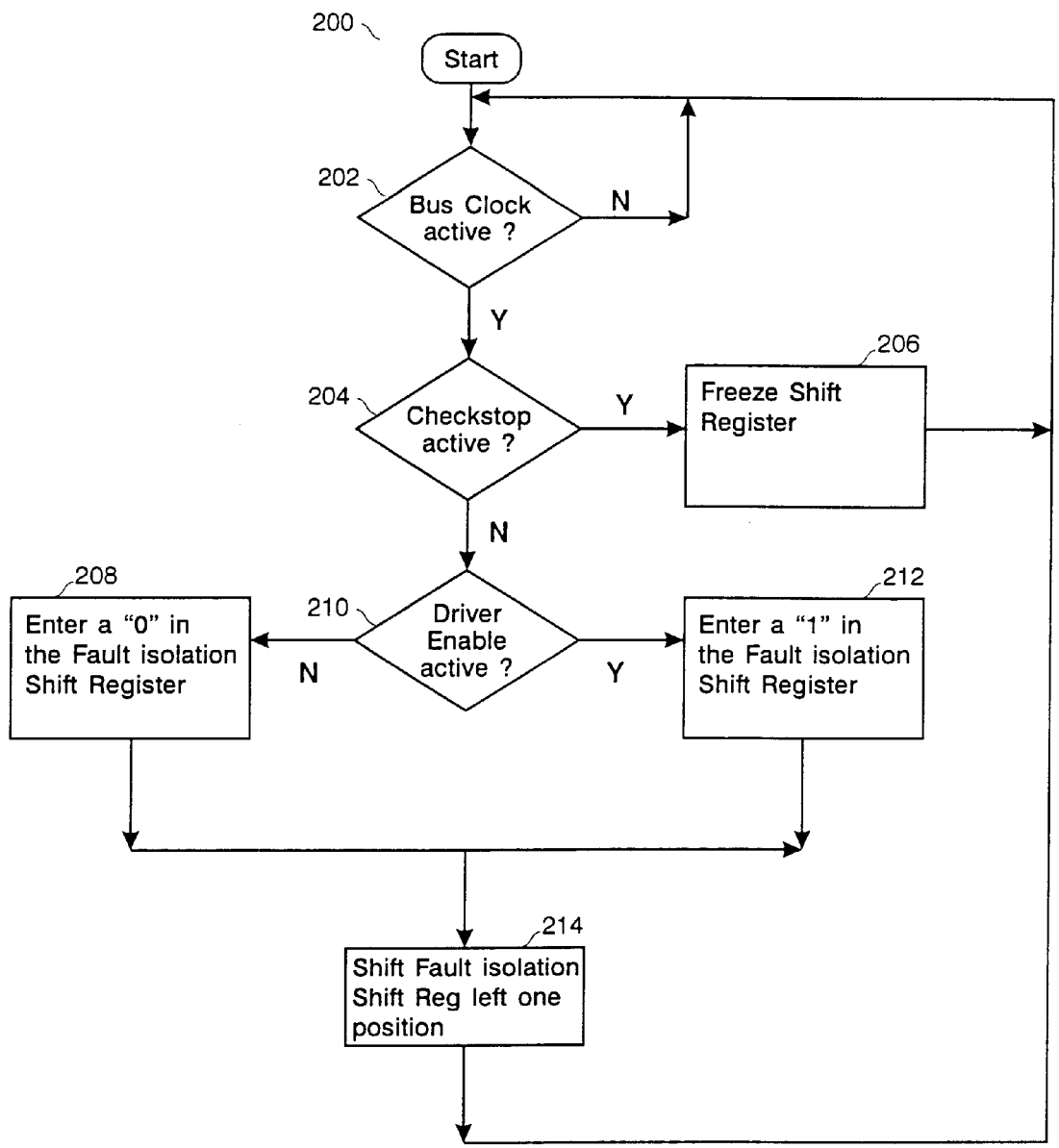
FIG. 3 is a flow chart of the present method.

FIG. 3 is a flowchart which illustrates the steps 200 of the present method. Generally, the method implements a shift register 100 which shifts data from the right-most bit 110 toward the left-most bit 120 as long as the result 160 of the bus clock 130 signal "AND"-ed with the inverse of the checkstop signal 140 is a positive input. In the first step of the method, the bus clock 130 signal is checked 202. If the bus clock 130 active, the processing in steps 204–214 will be performed. If not, the bus clock 130 signal will continue to be polled. In this fashion, a shift occurs only upon each cycle of the bus clock 130.

If the bus clock 130 is active, the checkstop signal 140 is checked 204. If the checkstop signal 140 is active, the operation of the shift register 100 is frozen or disengaged 206. At this point, fault scanning logic well known in the art can be used to determine the bus driver(s) enabled at the time of error.

If the bus clock 130 is active but checkstop signal 140 is not active, a shift will occur. To determine whether a "0" or "1" value will be shifted into the right-most bit 110 of the shift register 100, the Bus Driver Enable Signal 102 is checked 210. If the Bus Driver Enable Signal 102 is active, a "1" will be entered 212 into the right-most bit 110 of the shift register 100 and all other bit contents 170 will be shifted 214 one bit towards the left. If the signal 102 is not active, a "0" will be entered 208 into the right-most bit 110 of the shift register 100 and all other bit contents 170 will be shifted 214 one bit to the left.

It can be appreciated from the foregoing descriptions and explanations, that the present invention contemplates a computer system having a at least one processor and at least one I/O device. Accordingly, it will be appreciated that the detailed disclosure has been presented by way of example only and is not intended to be limiting. Various alterations, modifications and improvements will readily occur to those skilled in the art and may be practiced without departing from the spirit and scope of the invention. The invention is limited only as required by the following claims and equivalents thereto.

We claim:

1. A method of isolating a fault on a bus connecting a bus driver and at least two devices and operating in accord with a bus clock, said method comprising the steps of:

(a) sending a bus driver enable signal to a shift register;

(b) shifting the contents of the shift register in accordance with the bus clock, wherein the contents of the shift register represent discrete values of the bus driver enable signal during successive clock cycles;

(c) disengaging said register in response to a detected error;

(d) scanning the register to isolate the fault.

2. The method of claim 1 wherein step (c) includes disengaging said register in response to the assertion of a checkstop command.

3. The method of claim 1 wherein step (c) comprises determining which of said at least two devices generated the error.

4. An apparatus for isolating errors in a computer system having at least one bus line and a bus clock, the apparatus comprising:

(a) a bus enable signal;

(b) an error detection signal;

(c) a shift register to store the discrete value of the bus enable signal; operatively connected to (d) a means to combine the bus clock and the error detection signal to store the discrete value of the bus enable signal when the error detection signal is not asserted and to disengage the register when the error detection signal is asserted; and (e) a means to read the discrete values of the bus enable signal stored in the shift register to determine fault conditions when the error detection signal is asserted.

5. The apparatus of claim 4, wherein the error detection signal is a simple electronic pulse.

6. An apparatus for isolating errors in a computer system having at least one bus line and a bus clock, the apparatus comprising:

(a) a bus enable signal;

(b) an error detection signal;

(c) shift register to store the discrete value of the bus enable signal, wherein the shift register size is predetermined to accommodate the maximum number of bus clock cycles between an error and assertion of the error detection signal; operatively connected to (d) a means to read the discrete values of the bus enable signal stored in the shift register to determine fault conditions when the error detection signal is asserted.

7. The apparatus of claim 6, wherein the means to read includes reading all discrete values stored in the shift register.

8. The apparatus of claim 6 further comprising:

(e) a means to combine the bus clock and the error detection signal to store the discrete value of the bus enable signal.

9. The apparatus of claim 8, wherein the means to combine the bus clock and the error detection signal further includes storing the discrete value of the bus enable signal when the error detection signal is not asserted and disengaging the register when the error detection signal is asserted.

10. An apparatus for isolating errors in a computer system having at least one bus line and a bus clock, the apparatus comprising:

(a) a bus enable signal;

(b) an error detection signal;

(c) shift register to store the discrete value of the bus enable signal, wherein the shift register stores a predetermined number of discrete values and the output of the shift register is not stored; operatively connected to (d) a means to read the discrete values of the bus enable signal stored in the shift register to determine fault conditions when the error detection signal is asserted.

11. The apparatus of claim 10 further comprising:

(e) a means to combine the bus clock and the error detection signal to store the discrete value of the bus enable signal into the shift register.

12. The apparatus of claim 11, wherein the means to combine the bus clock and the error detection signal further includes storing the discrete value of the bus enable signal when the error detection signal is not asserted and disengaging the register when the error detection signal is asserted.

* * * * *